Figure 1:
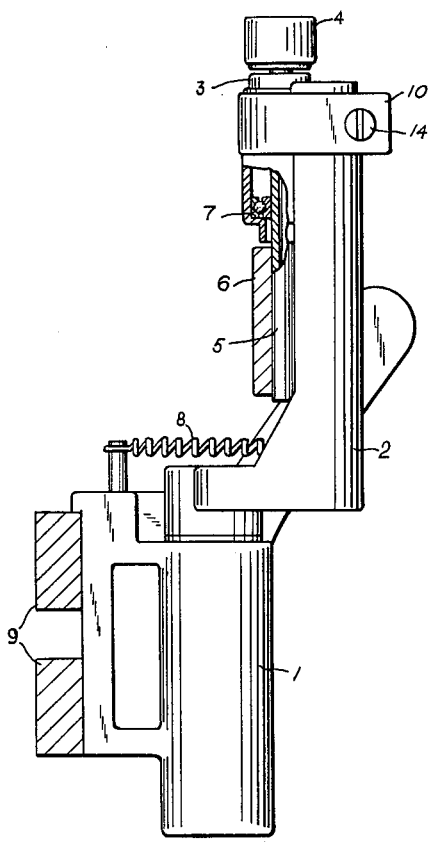

Jan. 22, 1963     E. P. R. SCRAGG     3,074,225
TEXTILE SPINDLE MACHINE MOUNTING
Filed Aug. 10, 1959

INVENTOR.
Ernest P. R. Scragg
BY
Michael S. Striker
Attorney

United States Patent Office 3,074,225
Patented Jan. 22, 1963

3,074,225
TEXTILE SPINDLE MACHINE MOUNTING
Ernest P. R. Scragg, Alderley Edge, near Macclesfield, England, assignor to Ernest Scragg and Sons Limited, Macclesfield, England
Filed Aug. 10, 1959, Ser. No. 832,762
Claims priority, application Great Britain Aug. 16, 1958
2 Claims. (Cl. 57—77.45)

This invention relates to mountings for spindles of textile machines and has for its object the provision of a simple, cheap and readily adjustable form of spindle mounting.

My invention is more particularly concerned with the provision of a mounting for a high speed false twist spindle assembly on an arm which is adapted, as for example by spring-loading, to bring a part of the spindle into contact with a driving belt. In an embodiment of my invention, the spindle assembly itself consists of a cylindrical outer casing through the centre of which passes a hollow spindle. The spindle is carried in ball or roller bearings, the inner races of which are fixed to or form part of the spindle, and the outer races are fixed to or form part of the casing. The spindle itself extends beyond the casing at each end, one extension being adapted to carry a false twist spinning head whilst the other extension forms the driving surface which is held against the driving belt.

The assembly is placed in a cradle forming part of an arm pivoted about an axis parallel with that of the spindle, the arm being spring-loaded so as normally to cause the driving extension of the spindle to rest against the driving belt. The cylindrical casing is held in the cradle by means of a metal band which passes round the casing and the cradle, and is tensioned so as to hold the casing firmly in the cradle by means of a screw passing through the two ends of the band. Partial release of the screw enables the assembly to be moved axially in the cradle so as to bring the correct portion of the spindle extension into exact alignment with the driving belt.

The arm itself may be provided with a catch or withdrawal mechanism so that the spindle may be held by the arm away from the driving belt when the spindle is required to be stationary, as for example during threading up. Alternatively the arm or support for the spindle mounting may itself be stationary, and the belt may be brought into driving contact with the spindle extension by belt deflecting means.

Alternative constructions of my invention include the substitution of spring means instead of a screw-tightened strap for fixing the spindle assembly in place on its cradle. The spring may for example be constructed of flat material and be of C form, so dimensioned as to clip the spindle assembly in place on its cradle. In a further alternative construction to that described, the spinner head may be located on the same extension of the spindle as that employed to drive the spindle by contact with the belt. Finally, although the casing carrying the bearings has been described as cylindrical, this form is not essential since the said casing may have a cross-section which is non-circular so as to prevent rotation of the casing on the cradle, and assist its exact location therein.

Figure 2:
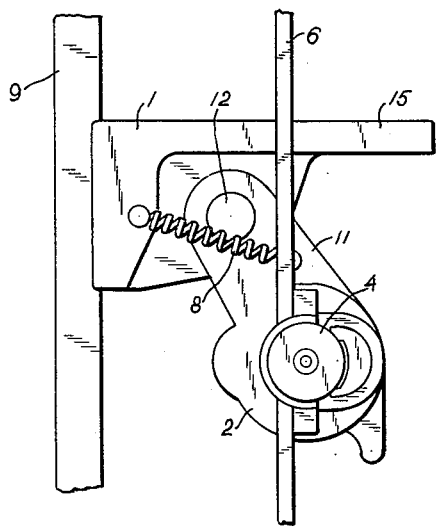

Reference should now be made to the accompanying drawing, in which FIG. 1 is a side view and FIG. 2 is a plan of an embodiment of a high speed false twist spindle according to my invention.

From the figures it will be seen that the spindle assembly itself consists of a cylindrical outer casing 3 through the centre of which passes a hollow spindle 13. The spindle is carried in ball or roller bearings, one of which is shown in the part section 7. The other is located at a point higher up the spindle and within the casing 3. The inner races of these bearings are fixed to or form part of the spindle, and the outer races are fixed to or form part of the casing. The spindle itself extends beyond the casing at each end, one extension being adapted to carry a false twist head 4 whilst the other extension 5 forms the driving means for the moving part of the spindle, the drive being derived from the driving belt 6.

The assembly is placed in a cradle 2 forming part of or attached to an arm 11 pivoted about a stub shaft 12 fastened to the arm 11 and rotatable in a hole in a framework member 1, this member being attached to bars 9 which form part of the framework of the machine. The arm 11 is connected to the frame member 1 by means of a spring 8, the spring being so located under tension as to cause the driving extension 5 of the spindle normally to rest against the belt 6.

The spindle assembly is held in the cradle by means of a metal band 10 which passes round the assembly and the cradle, and is tensioned by the screw 14 so as to hold the assembly firmly in the cradle. Facings on the inside of the cradle locate the false twist assembly accurately so that its axis of rotation is parallel with that of the stub shaft 12 and at right angles to the direction of motion of the belt 6. Partial release of the screw 14 enables the assembly to be moved axially in the cradle so as to bring the correct portion of the spindle extension 5 into exact alignment with the driving belt. The spindle 13 is drilled concentrically and the interior of the hole so formed is smoothed as by burnishing so that yarn passing through the hole is not damaged. The false twist head 4 is provided with one or more cross-members around which the yarn is taken during threading-up, the said cross-members providing the torque necessary to produce a false twist effect on the yarn.

The arm 11 may be provided with a catch or withdrawal mechanism so that the spindle may be held by the arm away from the driving belt when the spindle is required to be stationary, as for example during threading up. Again, the spring 8 may have its end pivoting points so located relative to the shaft 12 as to form an overcenter arrangement, in which case the spindle 13 may be removed from the belt by rotating the arm 11 in an anti-clockwise direction as seen in FIG. 2 so that a portion of the arm rests against the stop 15. Alternatively the arm may itself be made stationary, and the belt may be brought into driving contact with the spindle extension by a spring-loaded belt deflecting pulley (not shown) acting on the opposite side of the belt from that contacted by the extension 5.

Alternative constructions of my invention include the substitution of a spring clip instead of a screw-tightened strap for fixing the spindle assembly in place on its cradle. The spring may be constructed of flat material and be of C form so dimensioned as to clip the spring assembly in place on its cradle. Further, the head 4 may be located at the extreme end of the spindle extension 5 instead of as shown. Finally, although the casing carrying the bearings has been described as cylindrical, this form is not essential since the said casing may have an outer form which is non-circular so as to allow rotation of the casing in the cradle and assist its exact location therein.

I claim:
1. A high speed textile spindle mounting assembly comprising, in combination, a tubular, one-piece casing open only at its ends; a tubular false-twist spindle extending coaxially through and beyond said casing; a pair of bearing means carried by said casing in the interior thereof respectively adjacent said ends and supporting said spindle therein for rotation at high speed; a cradle; a band extending at least partway around said casing, having a width substantially less than the length of said casing, and engaging said cradle for fixing said casing to said cradle; and means releasably holding at least one end of said band in engagement with said cradle so that upon movement of said one end of said band away from said cradle said casing and the bearing means and spindle carried thereby, as a separate assembly, can be removed from and attached to said cradle.

2. A high speed textile spindle mounting assembly comprising, in combination, a tubular, one-piece casing open only at its ends; a tubular false-twist spindle extending coaxially through and beyond said casing; a pair of bearing means carried by said casing in the interior thereof respectively adjacent said ends and supporting said spindle therein for rotation at high speed; a cradle; a band extending at least partway around said casing, having a width substantially less than the length of said casing, and engaging said cradle for fixing said casing to said cradle; and a screw passing through at least one end of said band and threaded onto said cradle for releasably connecting said one end of said band thereto, whereby said screw may be partly loosened to release said casing for shifting movement with respect to said cradle so as to adjust the position of said spindle, or may be entirely loosened for removing said casing.

References Cited in the file of this patent
UNITED STATES PATENTS

| | | |
|---|---|---|
| 2,659,193 | Hegedus | Nov. 17, 1953 |
| 2,791,086 | Hilbert et al. | May 7, 1957 |
| 2,811,824 | Sweet | Nov. 5, 1957 |
| 2,819,583 | Gassner | Jan. 14, 1958 |
| 2,825,200 | Boullion | Mar. 4, 1958 |
| 2,863,278 | Scragg | Dec. 9, 1958 |
| 2,914,905 | Andrews et al. | Dec. 1, 1959 |

FOREIGN PATENTS

| | | |
|---|---|---|
| 738,535 | Great Britain | Oct. 12, 1955 |